March 29, 1960 L. A. DURANT 2,930,622

POPULARITY METER FOR PHONOGRAPH RECORD PLAYING APPARATUSES

Filed Sept. 7, 1954 2 Sheets-Sheet 1

INVENTOR.
LYNDON A. DURANT
Clarence E. Threedy
HIS ATTORNEY.

POPULARITY METER FOR PHONOGRAPH RECORD PLAYING APPARATUSES

Filed Sept. 7, 1954 2 Sheets-Sheet 2

INVENTOR.
LYNDON A. DURANT
BY Clarence E. Threedy
HIS ATTORNEY.

1

2,930,622

POPULARITY METER FOR PHONOGRAPH RECORD PLAYING APPARATUSES

Lyndon A. Durant, Chicago, Ill., assignor to United Music Corporation, Chicago, Ill., a corporation of Illinois Application September 7, 1954, Serial No. 454,306

2 Claims. (Cl. 274—10)

This invention relates to certain new and useful improvements in a popularity meter for phonograph record playing apparatuses and has for its principal object the provision of an arrangement of this character whereby a serviceman, operator, or other individual can, at a glance, determine the popularity of each of the records within the phonograph record playing apparatus.

Another and equally important object of this invention is to provided a popularity meter for phonograph record playing apparatuses in which apparatuses there is a record carrying magazine rotatable about a substantially horizontal transverse axis and comprising a plurality of partitions arranged in spaced facial relation with respect to each other to provide pockets extending radially from the horizontal axis, and which apparatus also includes means for individually removing the records from said pockets at a predetermined point in the cycle of rotation of the magazine.

More specifically, an object of the invention is to provide a member mounted on and rotatable with the magazine and extending therearound and radially therefrom and having a plurality of sight openings located opposite and in the plane of said pockets, and to associate with such member meter devices having indicia bearing dials to the rear of the sight openings together with means actuated by a record removing means at a predetermined point in the cycle of rotation of the magazine for independently actuating an adjacent one of said dials to successively expose the indicia thereof through its respective sight opening, whereby the exposed indicia are readily associated in the eye of the observer with the records to which they respectively relate and the popularity of which they designate.

Other objects will appear hereinafter.

The invention consists in the novel combination and arrangement of parts to be hereinafter described and claimed.

The invention will be best understood by reference to the accompanying drawings showing the preferred form of construction, and in which.

2

Figures 1, 2:
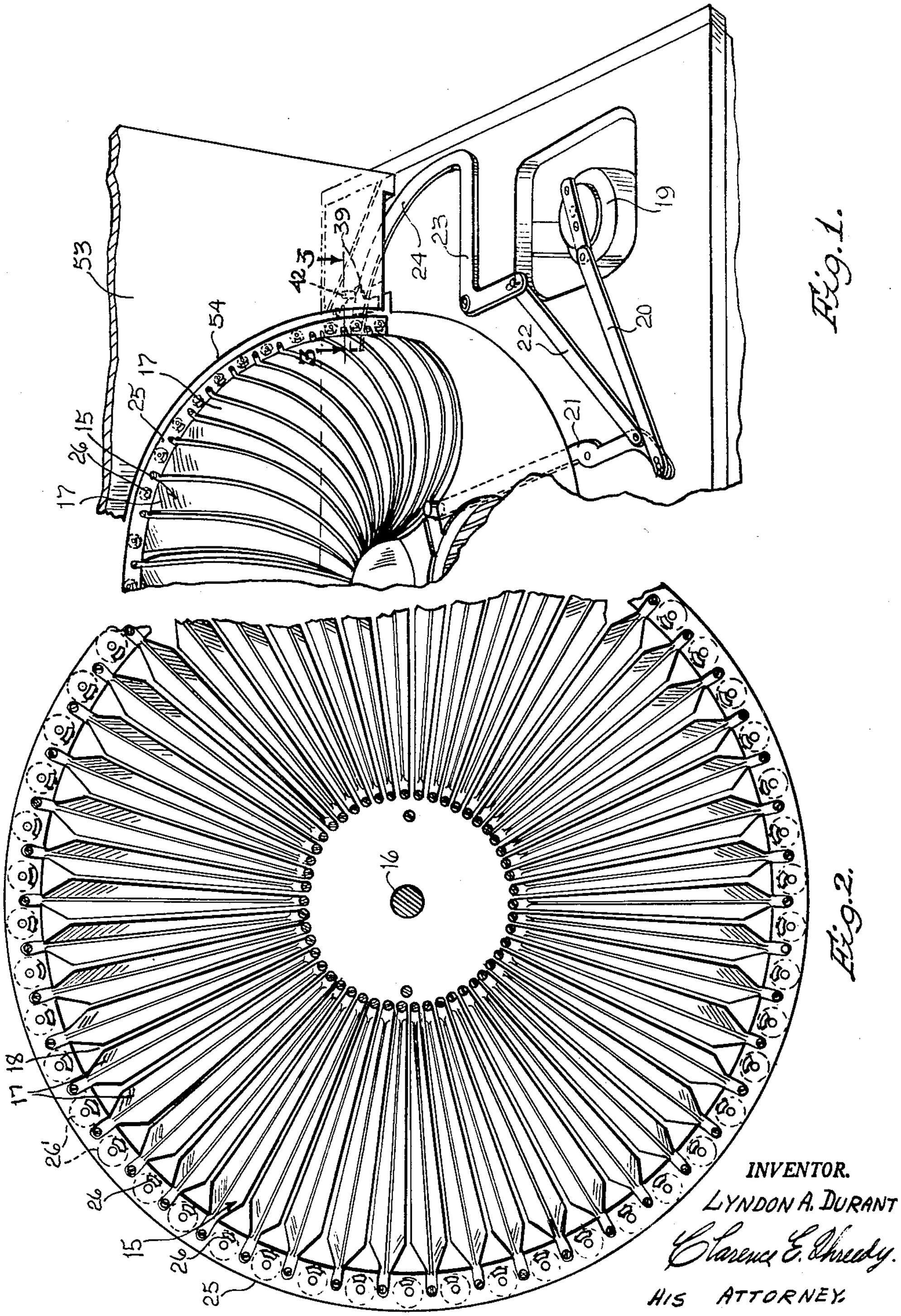
Fig. 1 is a fragmentary front elevational view of a phonograph record playing apparatus with which my invention is associated.
Fig. 2 is a sectional elevational view showing the record carrying magazine.
Figures 3, 4, 8, 9:
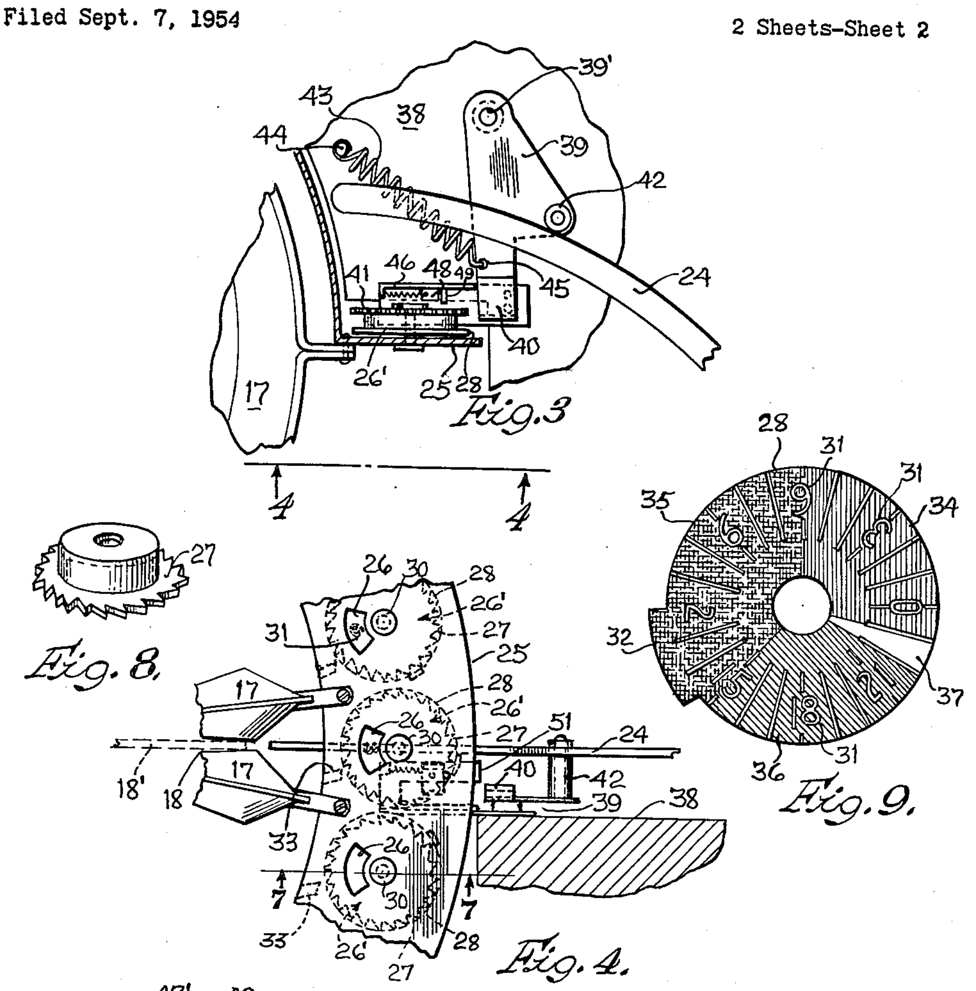
Fig. 3 is a fragmentary sectional detail view taken substantially on line 3—3 of Fig. 1.
Fig. 4 is a fragmentary elevational view taken substantially on line 4—4 of Fig. 3.
Figure 6:
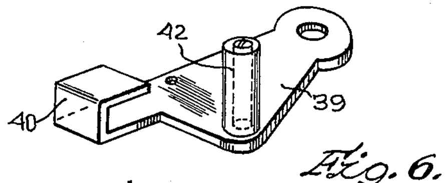
Figure 7:
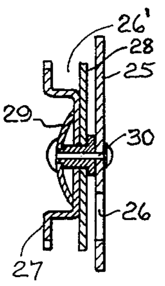
Figure 10:
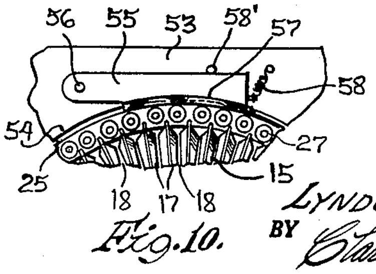

Fig. 6 is a perspective view of a ratchet wheel moving arm embodied in the invention;

Fig. 7 is a sectional detail view taken substantially on line 7—7 of Fig. 4;

Fig. 8 is a perspective view of a ratchet wheel embodied in the invention;

Fig. 9 is an enlarged plan view of a dial embodied in the invention;

Fig. 10 is a fragmentary elevational view taken from the rear of the apparatus shown in Fig. 1.

It is of great advantage to an operator or serviceman of phonograph record playing apparatuses that he be able to determine the popularity of the records played during a specific period of time. Many attempts have been made to provide a meter device for this purpose. Such devices have not proven satisfactory for the reason that the operator or serviceman is unable to determine at a glance what record the meter device is related to, with the consequence that he is often misled as to the record which is associated with a particular meter device. Other meter devices have been concealed within the apparatus, which requires the same to be opened before the popularity of the record can be read. As before stated, my invention has for its primary object that of providing a popularity meter for phonograph record playing apparatuses in which the meter devices are within full unobstructed view of the operator, serviceman or other individual, whereby he can at a mere glance determine the popularity of a particular record, without the necessity of studying the meter device to associate it with its record and without removing any part of the apparatus.

To accomplish this and other objects, my invention is preferably associated with a phonograph apparatus of a construction like that shown in my copending application, Serial No. 651,991, filed April 10, 1957, now Patent No. 2,909,373, issued October 20, 1959.

Such phonograph apparatus comprises a record magazine 15 mounted for rotation upon a substantially horizontal transverse shaft 16. This magazine, as shown in my copending application, comprises a plurality of partitions 17 arranged in facial relation with respect to each other and extending radially from the shaft 16 to provide pockets 18 within each of which is adapted to be mounted a record 18′ to be played.

Such an apparatus also includes means for removing a record from the magazine at a predetermined point in the cycle of its rotation. As shown, in my pending application, this means comprises, among other things, a motor 19 having pivotally connected thereto an arm 20 in turn pivotally connected to one end of a lever 21. The lever 21 is pivotally connected to a link 22 in turn connected to an arm 23 having a gooseneck shaped portion 24. This portion 24 is adapted to be moved in a substantially horizontal plane into and through a pocket at the predetermined point in the cycle of rotation of the magazine, to engage a record and remove the record from that particular pocket.

Referring to Fig. 2 the record magazine includes a ring-like plate 25 which is positioned to rotate coaxial with the main magazine shaft 16. The plate includes a plurality of equi-spaced openings 26 which are positioned to register with the outer edges of records retained in the magazine. Thus each said opening 26 provides a window through which each record is self-identified by indicia to be hereinafter described.

To the rear of this ring-like plate 25 are mounted meters 26'. Each meter comprises a ratchet wheel 27 and a dial 28 frictionally secured together by means of a spring washer 29, for rotation about their pivot support 30. The dial 28 has on one face thereof indicia 31 in the form of numerals. These numerals are adapted to be successively exposed through the sight openings 26.

On each dial 28 is a stop lug 32 which cooperates with a stop lug 33 carried by the ring-like plate 25 to limit the rotation of the dial. The face of the dial 28 on which the indicia 31 appear is also divided into sectors 34, 35, 36 and 37, the sector 37 being white, while the others are red, yellow and green, respectively. These sectors are successively exposed through the sight opening 26. On a partition 38 of the record playing apparatus is mounted as at 39' a pawl 39. This pawl 39 provides a ratchet wheel engaging portion 40 adapted to engage an adjacent ratchet wheel 41 of the ratchet wheels 27. Normally the pawl 39 is restrained from engagement with the ratchet wheel by the engagement of a roller 42 mounted on the pawl 39, which roller 42 bears against the gooseneck shaped portion 24 of the arm 23. A spring 43 having one end connected as at 44 to the partition 38 and an opposite end as at 45 to the pawl, functions to pull the pawl against the ratchet wheel 41 to effectuate rotation thereof whenever the arm 23 is moved into an adjacent pocket of the pockets 18 to engage and remove a record therefrom.

When the arm 23 is returned to its normal position as shown in Fig. 3, it engages the roller 42 and pivots the pawl 39 back to its starting position against the action of the spring 43. By this arrangement, each time a record is removed from a pocket 18 at a predetermined point in the cycle of rotation of the magazine for purposes of playing the record, a ratchet wheel 27 is advanced one step.

Figure 5:
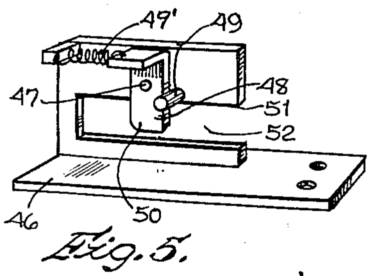
Fig. 5 is a perspective view of a releasing mechanism embodied in the invention.

In order to prevent the pawl 39 from rotating the ratchet wheel 27 in an opposite direction, I mount on the partition 38 a mounting bracket 46. On this mounting bracket 46 is pivotally mounted as at 47 a camming lever 48. Pivotal movement of this camming lever 48 in an anticlockwise direction is limited by a stop pin 49 against which pin the camming lever 48 is yieldably held by a spring 49'. The camming lever 48 when in engagement with the stop pin 49 will be in a substantially perpendicular position. The corner 50 of the camming lever 48 is beveled as shown. The ratchet engaging end 40 of the pawl 39 when pivoted in a clockwise direction as viewed in Fig. 3 by the action of the spring 43, will engage the lower end portion of the camming lever 48 and pivot the same in a clockwise direction as viewed in Fig. 5. In the upright section 51 of the bracket 46 is an open slot 52 to accommodate the ratchet wheel engaging end 40 of the pawl 39. After such end has been moved to a point beyond the camming lever 48, its return movement by action of the arm 23 will cause the ratchet wheel engaging end portion 40 of the pawl 39 to cam over the beveled corner 50, with the result that the pawl 39 will be flexed downwardly from engagement with the teeth of the ratchet wheel 41, with the consequence that in its return movement the pawl 39 will not effect rotation of the ratchet wheel and its related dial 28.

To reset the dials 28 to their original starting position, I provide on the back of an upright partition 53 which has a cut-out portion 54 to accommodate the magazine 15, an arm 55 (Fig. 10).

This arm 55 is pivoted as at 56 to the partition 53. The free end of the arm 55 carries a felt block 57 arranged in the path of movement of the ratchet wheels 27. The arm 55 is normally held out of such path against a stop 58' by a spring 58. By manually pivoting the arm 55 downwardly against the action of a spring 58 in the path of the ratchet wheels 27, the ratchet wheels 27 will be rotated in a direction opposite to their rotation by the pawl 39, with the consequence that they will be rotated to their initial or zero position as the magazine is rotated about its horizontal axis.

From the foregoing description, it is obvious that a serviceman, operator or other individual seeking to determine the popularity of a record, may instantly and at a glance determine the popularity of the record. It will be further apparent that the meters are so associated with the respective record carrying pockets as to enable immediate identification of the record to which the meter relates. By such arrangement, close and inconvenient inspection of the meter devices is eliminated. Inasmuch as the meter devices are unobstructed to the observer's sight, they may be readily viewed from the exterior of the apparatus, thereby dispensing with the necessity of removing any part of the apparatus in order to read the meter devices.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A multiple meter means for selectively recording the plays of the records in a selective phonograph comprising means forming a frame, a magazine in said frame adapted for rotation about a fixed axis for retaining a plurality of disc records in radial facial spaced relation including selecting means adapted to rotate and selectively stop said magazine and selectively register each of said records in a fixed planar transfer zone intersecting said magazine when said phonograph is operated, a record playing means positioned in said frame adjacent said magazine for playing said records transferred from said zone thereto when said phonograph is operated, record transfer means in said frame adapted to transfer each selected one of said records in said zone to and from said playing means and also adapted to selectively operate said meter means for each oscillation thereof when said phonograph is operated, said meter means consisting of a said plurality of like meter wheels journalled for independent rotation about independent axes on said magazine in equi-distant spaced relation from the said axis of said magazine with each of said wheels corresponding with and positioned adjacent each of said records, a stop means on each said wheel adapted to abut a corresponding stop on said frame for establishing a zero position for each of said wheels, a predetermined plurality of spaced progressive indicia positioned within equal segments on each of said wheels, a plurality of ratchet teeth on a periphery of each of said wheels corresponding with said segments adapted to successively rotate each of said wheels in advance direction from said zero position through angles equal to said segments when operated, fixed indicating means on said magazine adjacent each of said wheels positioned to identify each of said indicia registered therewith when each said wheel is sequentially rotated, pawl means pivotally secured to said frame in the path of movement of said transfer means responsive to the oscillation thereof and adapted to engage each of said teeth of each of said wheels registered therewith by said magazine for rotating said wheels one said segment for each oscillation of said transfer means whereby each of said wheels will be rotated in said advance direction a number of said segments equal to the number of times each of said records is transferred and played to said playing means and each said indicia registered with said indicating means will record the total number of said plays of each of said records when said phonograph is selectively operated.

2. The construction recited in claim 1 including a control means for rotating said magazine without operating said selecting and transfer means when operated, a wheel restore member pivoted to said frame for manual movement from a rest position to a restore position, means for normally urging said member into said rest position, a portion of said member adapted for engagement with the said teeth of each of said wheels when the latter are rotated in a common circular path with said magazine about the axis thereof when said control means is operated and said member is manually moved into said restore position whereby each of said wheels rotated by said transfer means will be rotated in reverse direction to restore same to their respective said zero positions.

References Cited in the file of this patent

UNITED STATES PATENTS

| | | |
|---|---|---|
| 1,799,148 | Bryant | Apr. 7, 1931 |
| 2,318,526 | Rockola | May 4, 1943 |
| 2,327,753 | Wilcox | Aug. 24, 1943 |
| 2,631,856 | Osborne | Mar. 17, 1953 |
| 2,804,307 | Rockola | Aug. 27, 1957 |

FOREIGN PATENTS

| | | |
|---|---|---|
| 731,730 | France | Sept. 6, 1932 |